United States Patent
Liang et al.

(10) Patent No.: US 11,740,736 B2
(45) Date of Patent: Aug. 29, 2023

(54) ELECTRONIC DISPLAY ADAPTIVE TOUCH INTERFERENCE SCHEME SYSTEMS AND METHODS

(71) Applicant: Apple inc., Cupertino, CA (US)

(72) Inventors: Anshi Liang, San Jose, CA (US); He Yi, Mountain View, CA (US); Yang Xu, San Jose, CA (US); Paolo Sacchetto, Cupertino, CA (US); Jun Li, San Jose, CA (US); Jingyu Huang, Sunnyvale, CA (US); Marc Joseph DeVincentis, Palo Alto, CA (US); Yue Jack Chu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 397 days.

(21) Appl. No.: 16/436,756

(22) Filed: Jun. 10, 2019

(65) Prior Publication Data
US 2020/0004378 A1 Jan. 2, 2020

Related U.S. Application Data

(60) Provisional application No. 62/690,634, filed on Jun. 27, 2018.

(51) Int. Cl.
*G06F 3/041* (2006.01)
*G06F 3/046* (2006.01)
*G06F 3/044* (2006.01)

(52) U.S. Cl.
CPC ............ *G06F 3/0418* (2013.01); *G06F 3/044* (2013.01); *G06F 3/046* (2013.01)

(58) Field of Classification Search
CPC combination set(s) only.
See application file for complete search history.

(56) References Cited

U.S. PATENT DOCUMENTS

| | | | |
|---|---|---|---|
| 9,024,912 B2 | 5/2015 | Atkinson et al. | |
| 9,335,859 B2 | 5/2016 | Small | |
| 9,372,581 B2 | 6/2016 | Cattivelli et al. | |
| 2012/0050217 A1* | 3/2012 | Noguchi | G06F 3/04184 345/174 |
| 2012/0056834 A1* | 3/2012 | Kim | G06F 3/0446 345/173 |

(Continued)

*Primary Examiner* — William Boddie
*Assistant Examiner* — Alecia D English
(74) *Attorney, Agent, or Firm* — Fletcher Yoder P.C.

(57) ABSTRACT

Techniques for implementing and/or operating an electronic device including a display pixel layer, which writes a display image during an active period and continues displaying the display image during a blanking period, and a touch sense layer, which generates a first touch image during the active period and a second touch image during the blanking period. The electronic device further includes a controller that determines a first noise metric indicative of display-to-touch noise resulting during the active period based on the first touch image, determines a second noise metric indicative of display-to-touch noise resulting during the blanking period based on the second touch image, and instructs the touch sense layer to not generate a third touch image during a subsequent active period in response to the first noise metric being greater than a noise threshold and the second noise metric not being greater than the noise threshold.

20 Claims, 12 Drawing Sheets

(56) References Cited

U.S. PATENT DOCUMENTS

| | | | |
|---|---|---|---|
| 2012/0249442 A1* | 10/2012 | Chang | G06F 3/04166 |
| | | | 345/173 |
| 2013/0194229 A1 | 8/2013 | Sabo et al. | |
| 2015/0049027 A1* | 2/2015 | Singh | G06F 3/0418 |
| | | | 345/173 |
| 2015/0355762 A1* | 12/2015 | Tripathi | G06F 3/04166 |
| | | | 345/173 |
| 2018/0181248 A1* | 6/2018 | Chang | G06F 3/0412 |
| 2018/0239493 A1* | 8/2018 | Khazeni | G06F 3/04184 |
| 2018/0275827 A1* | 9/2018 | Lin | G06F 3/0416 |

* cited by examiner

ELECTRONIC DISPLAY ADAPTIVE TOUCH INTERFERENCE SCHEME SYSTEMS AND METHODS

CROSS REFERENCE TO RELATED APPLICATIONS

This application claims the benefit of U.S. Provisional Application No. 62/690,634, entitled "Electronic Display Adaptive Touch Interference Scheme Systems and Methods," filed Jun. 27, 2018, which is incorporated herein by reference in its entirety for all purposes.

BACKGROUND

The present disclosure relates generally to interactions between an electronic display and touch sensing components of an electronic device. More particularly, the present disclosure relates generally to reducing the display-to-touch interference that may arise due to electrical interactions between display pixels of the electronic display and a touch sense layer.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information (e.g., text, still images, video) based on corresponding image content. For example, such electronic devices may include computers, mobile phones, portable media devices, virtual-reality headsets, and smart watches, among many others. In any case, to display an image, the electronic display may control light emission (e.g., luminance) of its display pixels based at least in part on corresponding image data. Additionally, in some instances, luminance of the display pixel may vary based at least in part on electrical energy stored in the display pixel. Thus, to control light emission from the display pixel, the electronic display may supply a data (e.g., analog electrical) signal to the display pixel based at least in part on corresponding image data and instruct the display pixel to store electrical energy based at least in part on the data signal, thereby writing (e.g., refreshing) the display pixel.

Electronic devices may also often include touch sensing components that detect touch of an object (e.g., finger or stylus) on the screen of the electronic display. For example, when the touch sensing components detect a touch at or near an icon for an application, the electronic device may open the application and instruct its electronic display to present a visual representation of the application. The touch sensing components may rely on electrical variations to detect the touch indication. For example, the touch sensing components may employ capacitive touch sensors that use capacitive coupling to detect an object at or near the screen of the electronic display. However, as electronic devices become more compact, the touch sensing component may be located in closer proximity to the display pixels, which, at least in some instances, may result in display-to-touch noise that affects accuracy and/or precision of the touch indications detected by the touch sensing components.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to reducing display-to-touch interference arising from interactions between display pixels of an electronic display and touch sensing components (e.g., a touch sense layer) of an electronic device and/or the electronic display by dynamically controlling touch scanning frequency based on calculated display-to-touch noise. In one example, the touch sense layer implemented in an electronic device may be used by the electronic device to detect touch indications that may control the operation of the device. However, in some embodiments, the touch sense layer may significantly overlap (e.g., positioned above, below, within, around) with the display pixels. In some instances, the close proximity between the touch sense layer and the display pixel layer may increase interaction between the two layers, for example, due to parasitic capacitance coupling that results in display-to-touch noise (e.g., false touch, jittery touch, and mis-touch) that perceivably affects accuracy and/or precision of touch indications detected by the touch sense layer.

To facilitate improved quality of touch detection, in some embodiments, timing of the touch scanning period may be adjusted to reduce likelihood of display-to-touch noise affecting touch detection by the touch sense layer. For example, the touch scanning period may occur partially in a display active period and partially in a display blanking period when the electronic display actively determines that the display-to-touch noise is below a noise threshold during both the active period and the blanking period. Additionally or alternatively, the touch scanning period may occur only in the display blanking period when the electronic device determines that the display-to-touch noise during the active period is greater than the noise threshold, for example, on a rolling basis.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
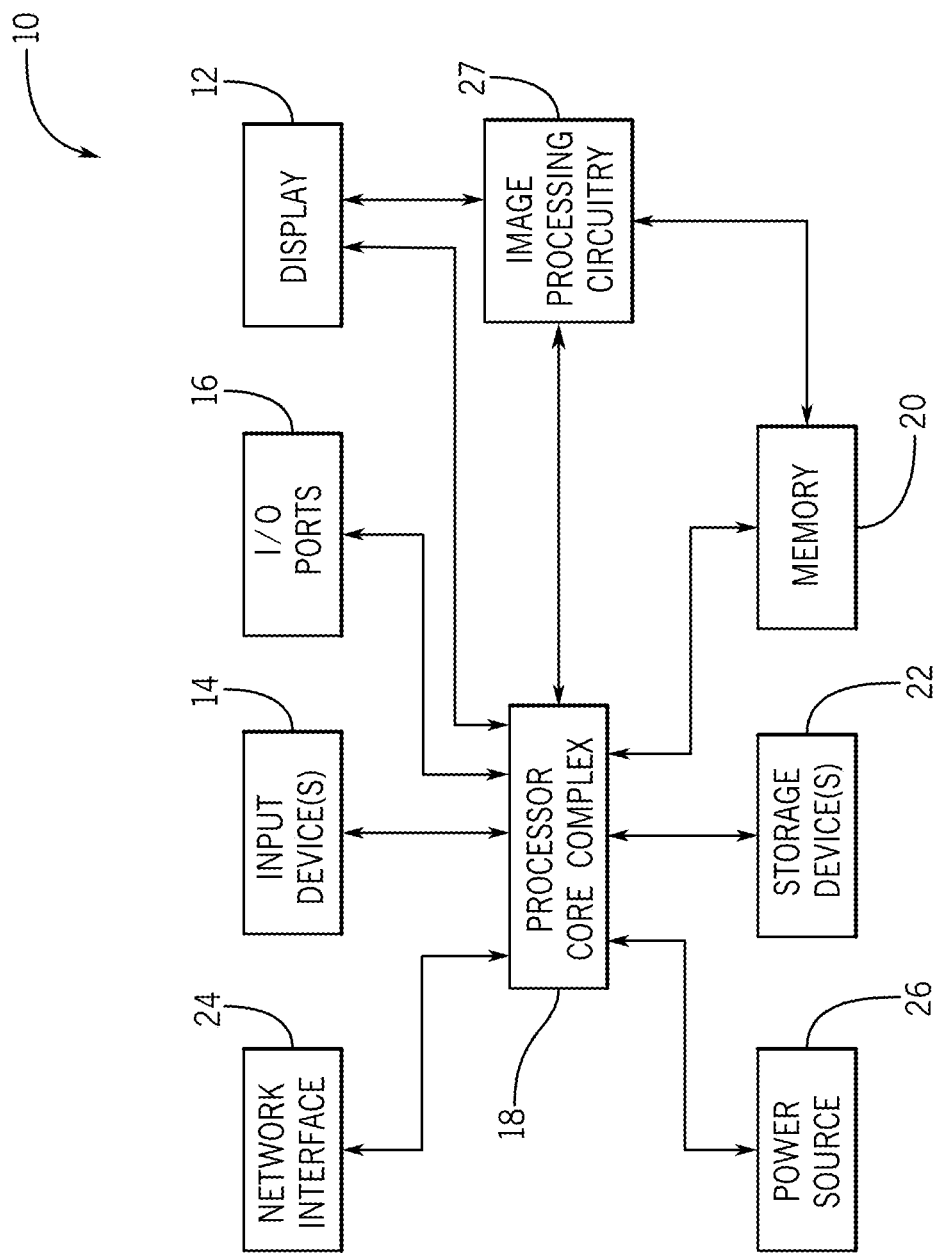
FIG. 1 is a block diagram of an electronic device, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to a touch sensing components (e.g., a touch sense layer), which may be used to detect presence of a touch indication that may control operations of an electronic device, and to electronic displays, which may be implemented to present visual representations of information, for example, in one or more image frames. Generally, an electronic display may display an image by controlling light emission and, thus, perceived (e.g., actual) luminance of its display pixel based at least in part on corresponding image data. In some electronic displays, light emission from the display pixel may vary based at least in part on electrical energy stored in the display pixel. For example, in a liquid crystal display (LCD) pixel, electrical energy may be stored in the pixel electrode of a display pixel to produce an electric field between the pixel electrode and a common electrode (display VCOM), which controls orientation of liquid crystals and, thus, light emission from the display pixel. Additionally, in an organic light-emitting diode (OLED) display, electrical energy may be stored in a storage capacitor of a display pixel to control electrical power (e.g., current) supplied to a self-emissive component (e.g., OLED) and, thus, light emission from the display pixel.

In some instances, image data may digitally indicate target luminance of display pixels for displaying an image on the electronic display. Since the image displayed is based on the stored electrical energy, the electronic display may write a display pixel by supplying an analog electrical (e.g., data) signal based at least in part on corresponding image data to the display pixel and instructing the display pixel to adjust electrical energy stored in its storage component (e.g., pixel electrode or storage capacitor) based at least in part the analog electrical signal. For example, to write an LCD display pixel, a data driver may output a data (e.g., source) signal and a scan driver may output a scan (e.g., gate) signal, which instructs the display pixel to supply the data signal to its pixel electrode to display the image frame. Additionally, to write an OLED display pixel, a data driver may output a data signal and a scan driver may output a scan control signal, which instructs the display pixel to supply the data signal to its storage capacitor.

The data driver may output the analog electrical (e.g., image data) signal corresponding to the image data to the electronic display during active periods (e.g., refresh periods). The display period of the image frame (e.g., frame period) may include the active period and a blanking period (e.g., vertical blanking period and/or horizontal blanking period) that occurs between successive active periods. Generally, during an active period, the display pixels of an electronic display may receive image data signals and store the corresponding amounts of electrical energy in the pixel electrodes, the display pixel storage capacitors, and/or the like. Additionally, the data drive may not send the image data signals during the blanking period and the display pixels may remain idle. The target refresh rate and other display pipeline parameters may determine the duration of the frame period, the active periods, and the blanking periods.

Additionally, the touch sense layer may be implemented in the electronic device to enable the electronic device to detect a touch indication on the electronic display. Examples include detecting touch from a finger, a stylus, and the like. The electronic device may use the touch indication to control operations of the device, such as opening an application when the touch indications occurs near the application icon on the electronic display. Generally, the touch sense layer may be integrated within, around, below, or above the electronic display, for example, for example depend on dimensions of the electronic device.

Further, the touch sense layer may include touch sensors (e.g., capacitive touch sensors and/or resistive touch sensors) that rely on changes in impedance (e.g., capacitance and/or resistance) to determine occurrence of a touch and, thus, a touch indication. For example, a voltage may be applied to the capacitive touch sensors to generate a relatively uniform electric field and, in response to an object coming near or touching the electronic display, the electric field local to the object may vary from the uniform value resulting in a change of capacitance sensed by touch sensors near that area of the display. In some instances, the electronic device may determine that a touch indication has occurred by periodically measuring the variations of the target electrical parameters during a touch scanning period. For example, a touch scan may occur using time-multiplexing with the electronic display. That is, the touch scan may occur during the blanking period (e.g., inter-frame pause) and/or during a pause inserted in the middle of the active period (e.g., intra-frame pause).

However, at least in some instances, display-to-touch noise may affect the value of target electrical parameter variations measured by the touch sense layer and, thus, the accuracy and precision of the detected touch indication. For example, when the display pixel is written to (e.g., refreshed) during the active period, the electric field generated as the display pixel stores the image data may non-uniformly contribute to the electric field across the touch sense layer, for example, causing one or more local fluctuations of the target electrical parameter (e.g., capacitance) that is detected as one or more touch indications by the electronic device. The effect on the values of the target electrical parameter may vary based at least in part on the strength of parasitic capacitance coupling between the touch sense layer and the display pixel layer, which encourages electric field interactions between the layers.

Since there is greater demand for thinner, higher display resolution, higher refresh rates, and faster touch response time electronic devices, the close proximity of the touch sense layer and the display pixel layer may increase the strength of the parasitic capacitance coupling and/or may increase the difficulty of time multiplexing the display operations and the touch sense layer operations. Thus, when the electronic device is implemented with both the display pixel layer and the touch sense layer, the electrical interactions between the layers of a compact electronic device may be high, thereby increasing likelihood of display-to-touch interferences (e.g., noise) affecting accuracy and/or precision of the detected touch indication, for example, perceivable as a false touch, a jittery touch, or a mis-touch.

As such, the present disclosure provides techniques to facilitate improving the accuracy and/or precision of touch indications determined by the electronic device implemented with a touch sense layer and an electronic display. For example, by dynamically controlling (e.g., adjusting) the touch scanning frequency based on display-to-touch noise calculated during the active periods and the blanking periods, the display-to-touch interferences may be reduced. In fact, the present techniques may mitigate or even eliminate random changes to the target electrical parameter values by the electric field generated when refreshing the display pixels, for example, without using additional hardware or shielding layers. Further, the present techniques may enable dynamically and seamlessly switching between a high precision, high frequency touch sense mode and a low frequency, low noise touch sense mode based at least in part on the display-to-touch noise.

To facilitate improving quality of touch detection, in some embodiments, a processor core complex (e.g., controller) may determine whether there is a greater likelihood that the measured variations of the target electrical parameter are due to noise. For example, the controller may actively calculate the display-to-touch noise of a touch image obtained during each touch scanning period. Additionally or alternatively, the controller may, on a rolling basis, determine a first noise metric (e.g., standard deviation) of the display-to-touch noise over multiple (e.g., 30) touch images obtained during the display active period and a second noise metric of multiple touch images obtained during the display blanking period to facilitate distinguishing between the image signal and the display-to-touch noise.

Moreover, in some embodiments, parameters (e.g., frequency and/or duration) of the touch scanning period may be adjusted by the controller when the calculated display-to-touch noise for the touch images detected during the active period and the blanking period are below a noise threshold. For example, the touch scanning period may be split such that touch images are obtained during the active period and the blanking period of each frame period. Splitting the touch scanning period may increase the amount of touch image frames obtained by the electronic device and, therefore, may enable the electronic device to respond to a touch indication at a faster rate. As such, in some embodiments, the controller may control the frequency (e.g., 120 Hz) and/or duration of the touch scanning period during each frame period such that each touch scanning period occurs partially in the active period and partially in the blanking period to facilitate improving response time to a touch indication.

Furthermore, in some embodiments, the parameters (e.g., frequency and/or duration) of the touch scanning period may be adjusted when the calculated display-to-touch noise for the touch images detected during the active period is above a noise threshold and the display-to-touch noise for the touch images detected during the blanking period is below the noise threshold. The touch scanning period, for example, may occur entirely during the display blanking period of each frame period. In some embodiments, the touch scanning period may occur entirely in the display blanking period. Additionally or alternatively, the touch scanning period may be split such that a touch scanning period of a smaller duration occurs during the blanking period. That is, the touch scanning period that may occur during the active period is dropped while the touch scanning period that occurs during the blanking period remains. As such, in some embodiments, the controller may control the frequency (e.g., 60 Hz) and/or duration of the touch scanning period of each frame period such that the accuracy and precision of touch indications measured by the touch sense layer is not affected by the display-to-touch noise.

Additionally or alternatively, the touch scanning frequency may be adjusted based at least in part on the display-to-touch noise and the refresh rate of a variable display refresh rate system. For example, when the display-to-touch noise is higher than the noise threshold in a variable display refresh rate system running in low power mode, the display blanking period may have a long enough duration such that the touch scanning period may occur during the display blanking period (e.g., as one or more periods). In other words, in some embodiments, the controller may determine the duration of the active period and the blanking period and change the frequency and/or duration of the touch scanning period based on the duration of the blanking period.

With the foregoing in mind, an electronic device 10, which may utilize an electronic display 12 to display images and to detect touch indications, is shown in FIG. 1. As will be described in more detail below, the electronic device 10 may be any suitable computing device, such as a handheld computing device, a tablet computing device, a notebook computer, and/or the like. Thus, it should be noted that FIG. 1 is merely one example of a particular implementation and is intended to illustrate the types of components that may be present in the electronic device 10.

In the depicted embodiment, the electronic device 10 includes the electronic display 12, one or more input devices 14, one or more input/output (I/O) ports 16, a processor core complex 18 having one or more processor(s) or processor cores, memory 20 that may be local to the device 10, a main memory storage device 22, a network interface 24, power source 26, and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 20 and the main memory storage device 22 may be included in a single component. Additionally, the image processing circuitry 27 (e.g., a graphics processing unit (GPU)) may be included in the processor core complex 18.

As depicted, the processor core complex 18 is operably coupled with memory 20 and the main memory storage device 22. In some embodiments, the memory 20 and/or the main memory storage device 22 may be tangible, non-transitory, computer-readable media that stores instructions executable by the processor core complex 18 and/or data to be processed by the processor core complex 18. For example, the memory 20 may include random access memory (RAM) and the main memory storage device 22 may include read only memory (ROM), rewritable non-volatile memory such as flash memory, hard drives, optical discs, and/or the like.

In some embodiments, the processor core complex 18 may execute instructions stored in memory 20 and/or the main memory storage device 22 to perform operations, such as signaling (e.g., instructing) the touch sense layer of the display 12 to generate a touch image. As such, the processor core complex 18 may include one or more general purpose microprocessors, one or more application specific processors (ASICs), one or more field programmable logic arrays (FPGAs), or any combination thereof. Additionally or alternatively, the processor core complex 18 include a controller (e.g., timing controller (TCON)) dedicated to the display 12 and/or additional controllers dedicated to other operations to the electronic device 10. For example, the TCON may calculate the noise metric of each touch scan period and may instruct the touch sense layer to periodically scan for a touch indication.

Further, as depicted, the processor core complex 18 is operably coupled with I/O ports 16, which may enable the electronic device 10 to interface with various other electronic devices. For example, a portable storage device may be connected to an I/O port 16, thereby enabling the processor core complex 18 to communicate data with a portable storage device. In this manner, the I/O ports 16 may enable the electronic device 10 to output image content to the portable storage device and/or receive image content from the portable storage device.

Furthermore, the processor core complex 18 is also operably coupled to the power source 26, which may provide power to the various components in the electronic device 10. The power source 26 may include any suitable source of energy, such as a rechargeable lithium polymer (Li-poly) battery and/or an alternating current (AC) power converter.

As depicted, the processor core complex 18 is operably coupled with input devices 14, which may enable a user to interact with the electronic device 10. In some embodiments, the inputs devices 14 may include buttons, keyboards, mice, trackpads, and the like.

Additionally, as depicted, the processor core complex 18 is operably coupled with the network interface 24. Using the network interface 24, the electronic device 10 may communicatively couple to a communication network and/or other electronic devices. For example, the network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit image content to a network and/or receive image content from the network for display on the electronic display 12.

The electronic display 12 may use, for example, organic light-emitting diode (OLED) or liquid-crystal display (LCD) technology to present visual representations of information by displaying images, such as a graphical user interface (GUI) of an operating system, an application interface, a still image, or video content. As described above, the electronic display 12 may display an images based on image data received from memory 20, a storage device (e.g., main memory storage device 22 and/or an external storage device), and/or another electronic device 10, for example, via the network interface 24 and/or the I/O ports 16. The electronic display 12 may display the images once the image content has been fetched from memory 20 and processed by the image processing circuitry 27. The electronic display 12 may also include touch sensing components (e.g., capacitive touch sensors) in the form of a touch sense layer that enables user input to the electronic device 10 by detecting touch indications and/or position of an object touching the screen (e.g., surface of the electronic display 12). The touch sense layer may be integrated with the display pixels and/or above, below, or encasing the screen.

Figure 2:
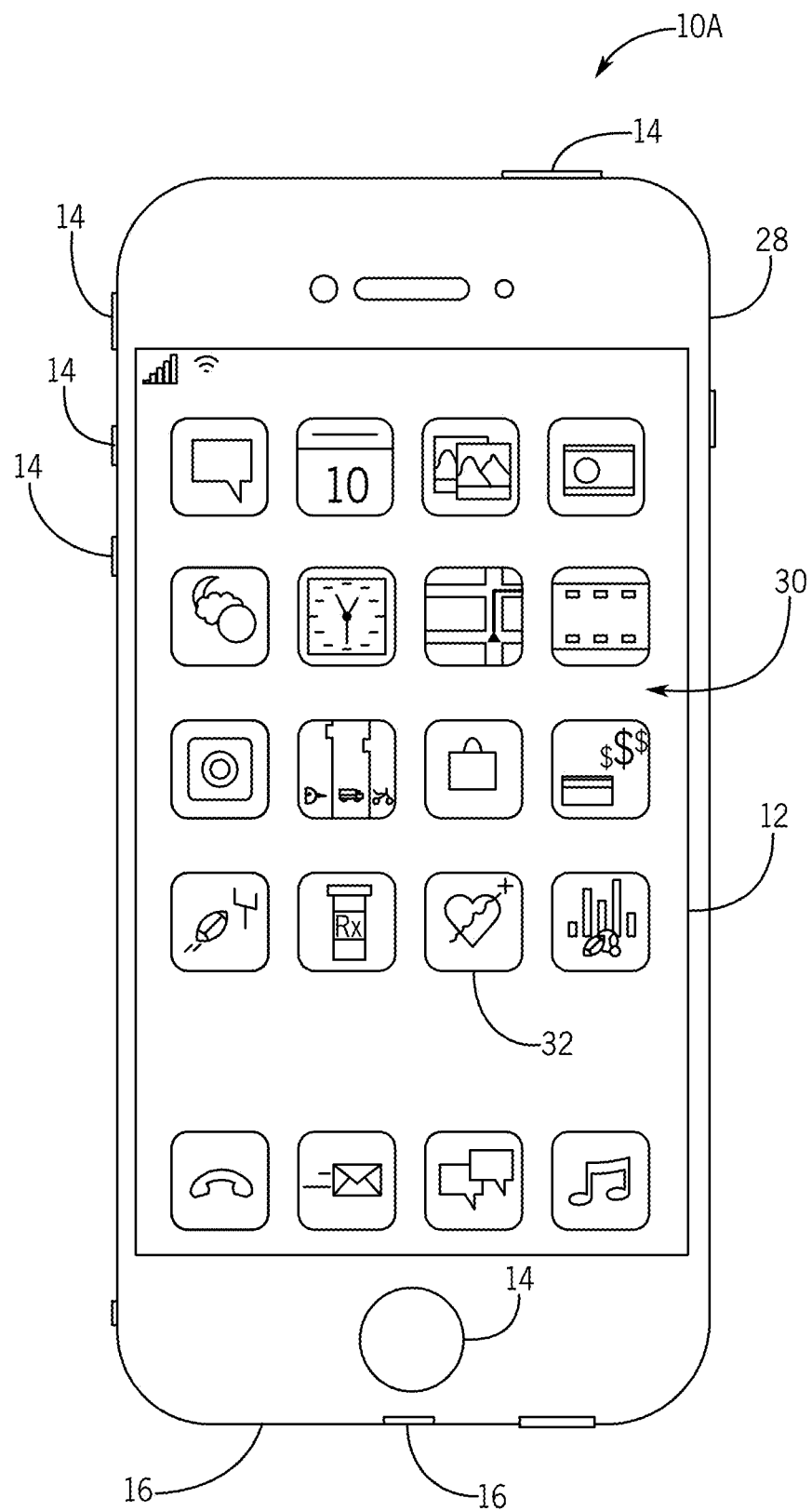
FIG. 2 is an example of the electronic device of FIG. 1 in the form of a handheld device, in accordance with an embodiment of the present disclosure.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electric interference. Additionally, as depicted, the enclosure 28 surrounds the electronic display 12. In the depicted embodiment, the electronic display 12 is displaying a graphical user interface (GUI) 30 having an array of icons 32. By way of example, when an icon is selected either by an input device 14 or a touch sensing component of the electronic display 12, an application program may launch.

Furthermore, as depicted, input devices 14 open through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 also open through the enclosure 28. In some embodiments, the I/O ports 16 may include, for example, an audio jack to connect to external devices.

Figure 3:
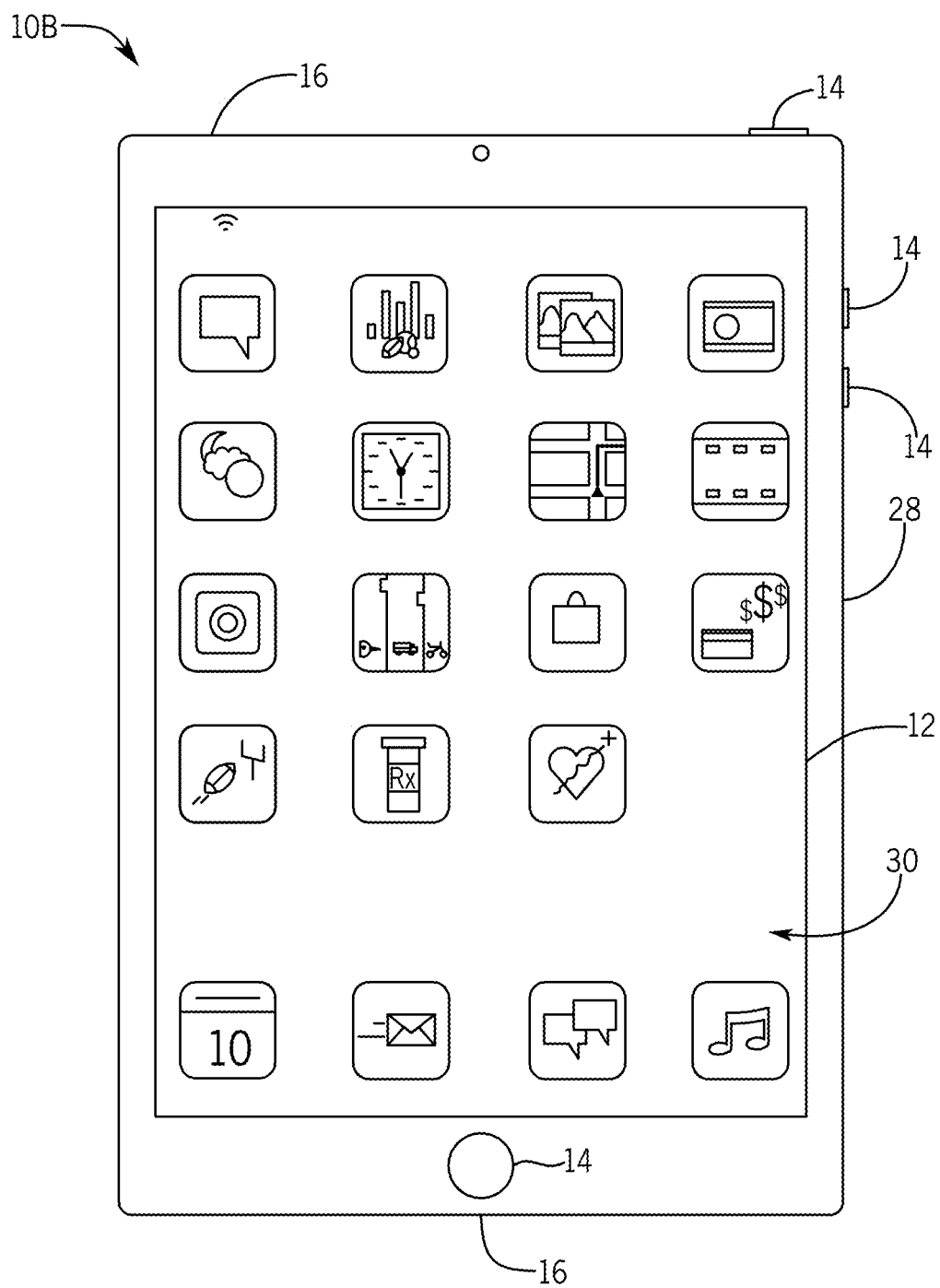
FIG. 3 is another example of the electronic device of FIG. 1 in the form of a tablet device, in accordance with an embodiment of the present disclosure.
Figure 4:
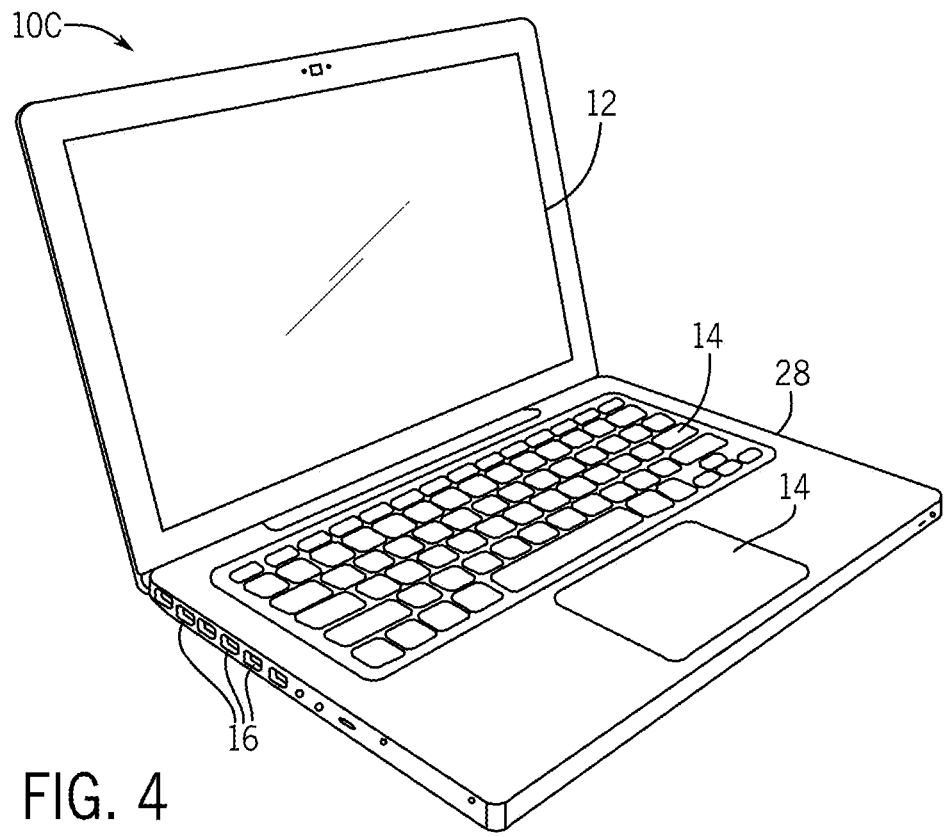
FIG. 4 is another example of the electronic device of FIG. 1 in the form of a notebook computer, in accordance with an embodiment of the present disclosure.
Figure 5:
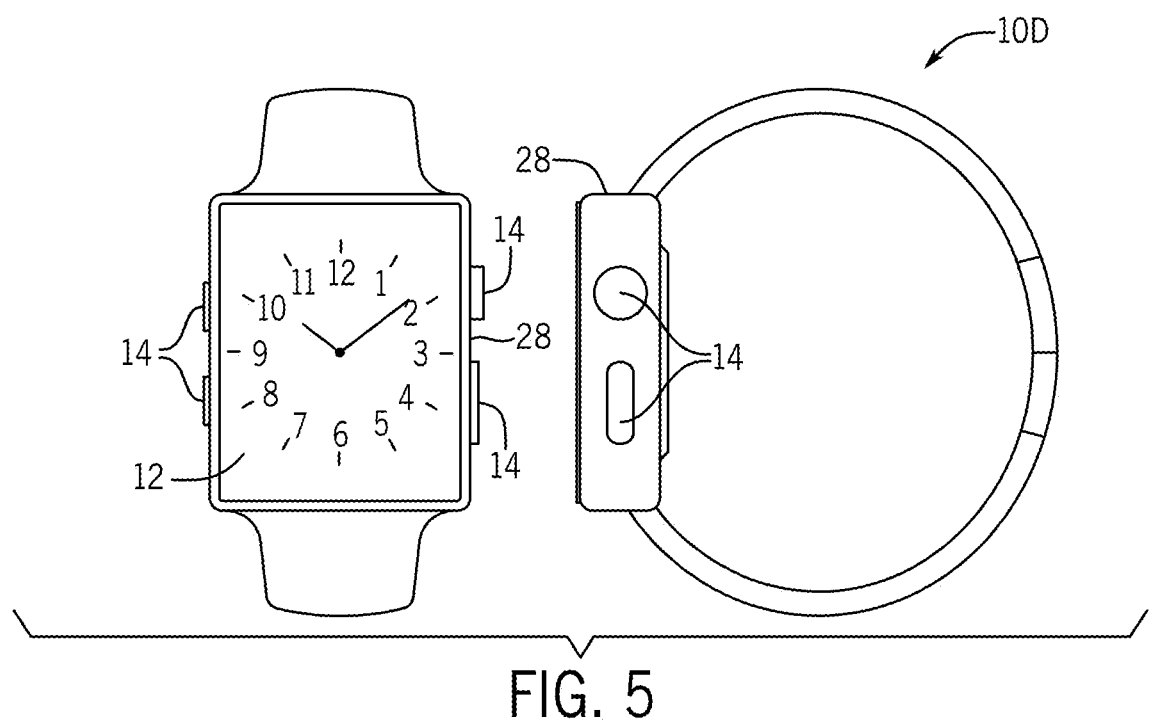
FIG. 5 is another example of the electronic device of FIG. 1 in the form of a smart watch, in accordance with an embodiment of the present disclosure.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28.

As described above, an electronic display 12 that may display images based at least in part on the image data, for example, that indicates target luminance of its display pixels. Additionally, as described above, the electronic display 12 may detect a touch indication in response to an object coming near or contacting the electronic display 12. In some embodiments, the timing of touch sensing may be coordinated (e.g., controlled) based on the timing of the electronic display 12 and/or the display-to-touch noise, for example, to reduce (e.g., minimize) likelihood that the display-to-touch noise perceivably affects touch sensing accuracy and/or responsiveness.

Figure 6:
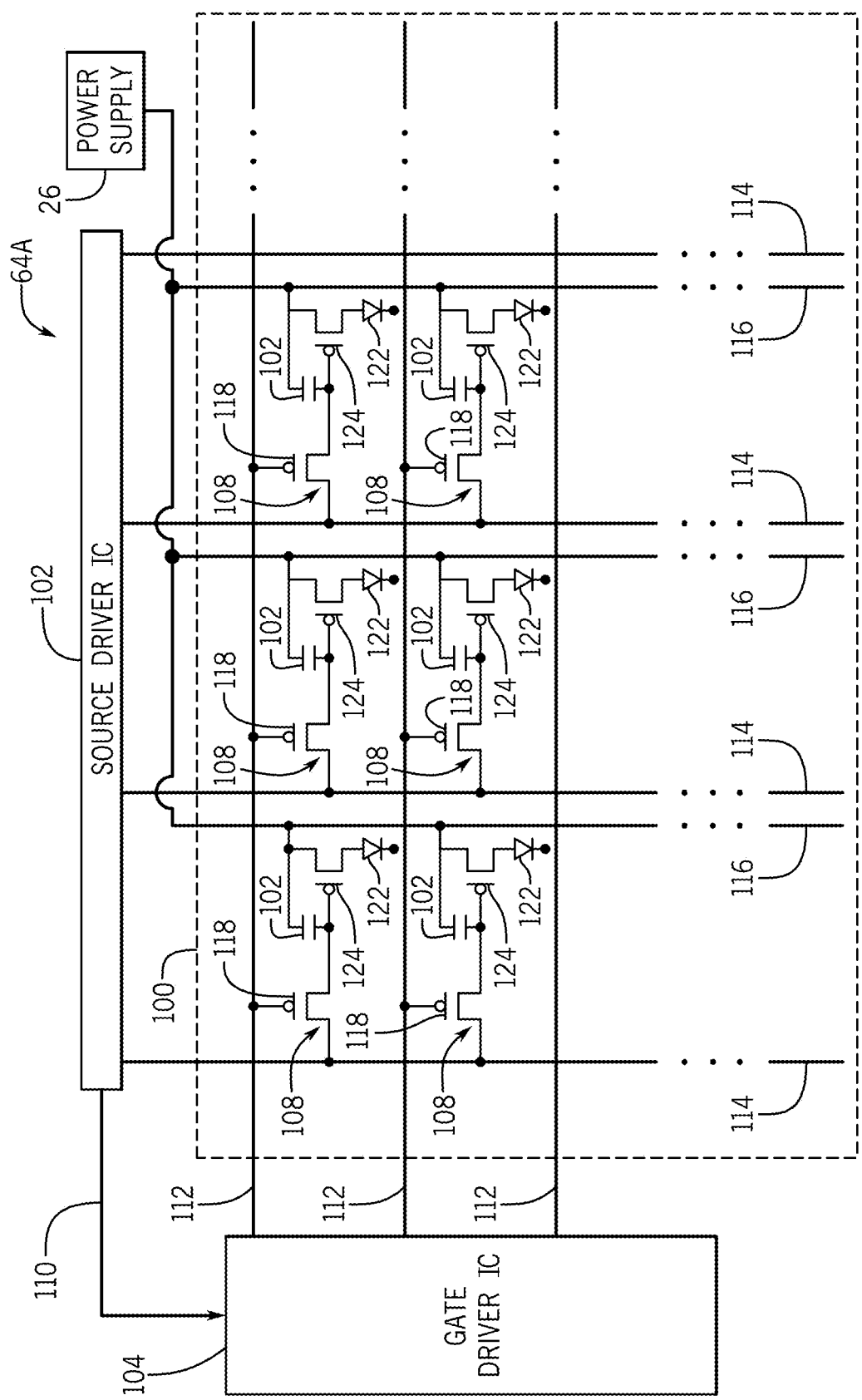
FIG. 6 is a block diagram of an organic light emitting diode (OLED) electronic display, in accordance with an embodiment of the present disclosure.

To help illustrate, an example of a display panel 64, which may be implemented in an electronic display 12, is shown in FIG. 6. As depicted, the display panel 64A includes a pixel array 100, a source driver 102, a gate driver 104, and a power supply 106. In particular, the pixel array 100 may include multiple display pixels 108 arranged as an array or matrix defining multiple rows and columns. For example, the depicted embodiment includes six display pixels 108. It should be appreciated that although only six display pixels 108 are depicted, in an actual implementation the pixel array 100 may include hundreds or even thousands of display pixels 108.

As described above, an electronic display 12 may display image frames by controlling luminance of its display pixels 108 based at least in part on processed image data received via the display panel 64. To facilitate displaying an image frame, a timing controller may determine and transmit timing data 110 to the gate driver 104 based at least in part on the processed image data. For example, in the depicted embodiment, the timing controller may be included in the source driver 102. Accordingly, in such embodiments, the source driver 102 may receive the processed image data that indicates desired luminance of one or more display pixels 108 for displaying the image frame, analyze the processed image data to determine the timing data 110, and transmit the timing data 110 to the gate driver 104. Based at least in part on the timing data 110, the gate driver 104 may then transmit gate activation signals to activate a row of display pixels 108 via a gate line 112.

When activated, luminance of a display pixel 108 may be adjusted by processed image data received via data lines 114. In some embodiments, the source driver 102 may generate the image by receiving a voltage corresponding to a processed image data. The source driver 102 may then supply the processed image data to the activated display pixels 108. Thus, as depicted, each display pixel 108 may be located at an intersection of a gate line 112 (e.g., scan line) and a data line 114 (e.g., source line). Based on received image data, the display pixel 108 may adjust its luminance using electrical power supplied from the power supply 106 via power supply lines 116.

Each display pixel 108 may include a circuit switching thin-film transistor (TFT) 118, a storage capacitor 120, an OLED 122, and a driving TFT 124 whereby each of the storage capacitors 120 and the OLED 122 are coupled to a common voltage, VCOM. To facilitate adjusting luminance, the driving TFT 124 and the circuit switching TFT 118 may each serve as a switching device that is controllably turned on and off by voltage applied to the respective gate. In the depicted embodiment, the gate of the circuit switching TFT 118 is electrically coupled to a gate line 112. Accordingly, when a gate activation signal received from its gate line 112 is above its threshold voltage, the circuit switching TFT 118 may turn on, thereby activating the display pixel 108 and charging the storage capacitor 120 with the processed image data received at its data line 114.

Additionally, in the depicted embodiment, the gate of the driving TFT 124 is electrically coupled to the storage capacitor 120. As such, voltage of the storage capacitor 120 may control operation of the driving TFT 124. More specifically, in some embodiments, the driving TFT 124 may be operated in an active region to control magnitude of supply current flowing from the power supply line 116 through the OLED 122. In other words, as gate voltage (e.g., storage capacitor 120 voltage) increases above its threshold voltage, the driving TFT 124 may increase the amount of its channel available to conduct electrical power, thereby increasing supply current flowing to the OLED 122. On the other hand, as the gate voltage decreases while still being above its threshold voltage, the driving TFT 124 may decrease amount of its channel available to conduct electrical power, thereby decreasing supply current flowing to the OLED 122. In this manner, the display panel 64A may control luminance of the display pixel 108.

Because of how OLED display technology drives the display pixels 108 (e.g., push the circuit switching TFT 118 into the active region, charge the storage capacitor 120, and drive the driving TFT 124), OLED displays 64A may generate relatively large amounts of display-to-touch noise when electrical signal is sent along the data line 114 to the display pixel 108 when the gate line 112 is activated. That is, the OLED displays 64A may generate display-to-touch noise during the active period that interferes with the accuracy and precision of touch indication detection. Although OLED technology was described in detail above, any display technology (e.g., LCDs) that may encounter display-to-touch interference.

Figure 7:
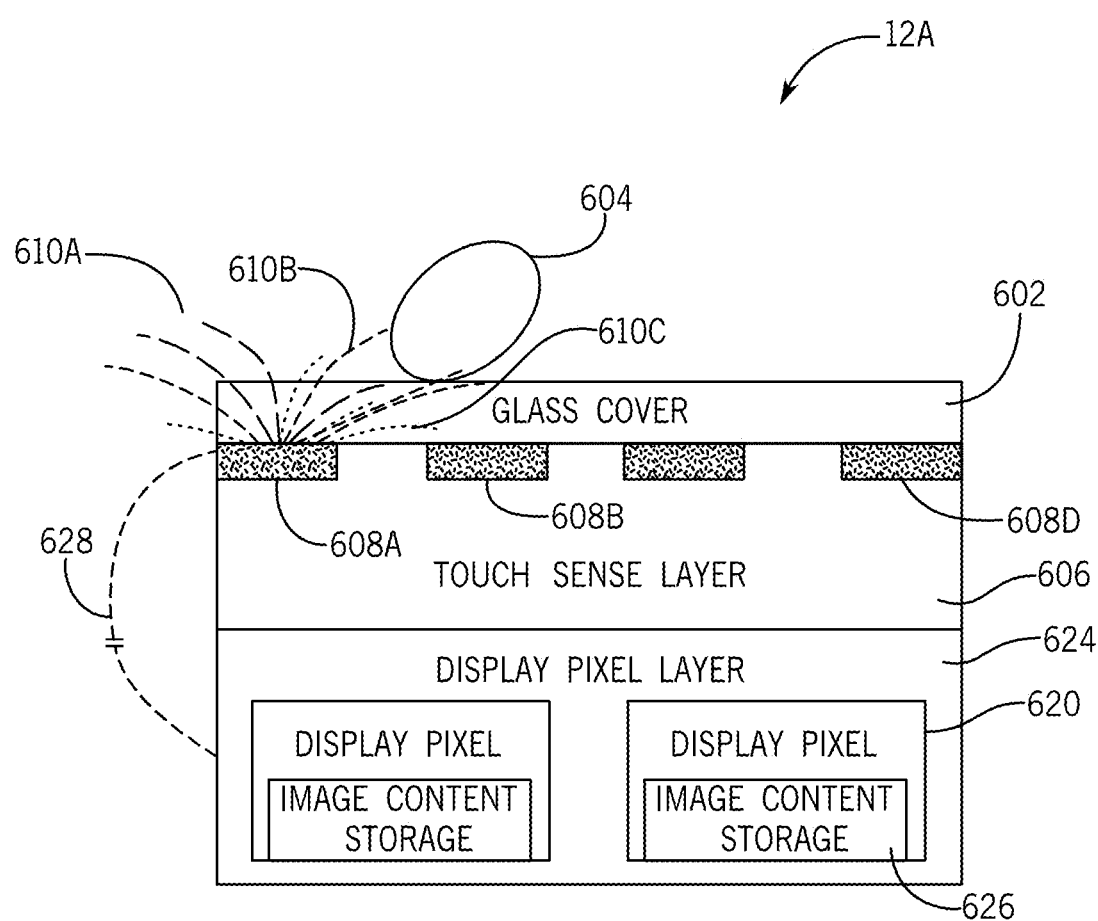
FIG. 7 is a schematic diagram of an electronic display including a touch sense layer and a display pixel layer, in accordance with an embodiment of the present disclosure.

To help further illustrate, an example of an electronic display 12A, which include a touch sense layer 606 and a display pixel layer 624, is shown in FIG. 7. In some embodiments, the display 12A may include a glass cover 602 that protects the internal components of the display 12A and is the interface point for user inputs via touch indications from an object 604. As in the depicted example, the touch sense layer 606 may include touch sensors 608A-608D that detect the presence of the touch indication. In some embodiments, the touch sensors 608A-608D (e.g., capacitive touch sensors, resistive touch sensors) may rely on changes in target electrical parameters (e.g., capacitance or resistance) to detect the presence of the touch indication.

For example, the electronic device 10 may apply a voltage to the touch sensors 608A-608D to generate a relatively uniform, fringing electric field 610A across the touch sense layer 606 and a capacitance of the touch sense layer 606.

When the object 604 approaches or touches the electronic display 12A, a portion of the electric field 610B is "stolen" by the object 604. That is, a portion of the electric field 610B extends to the object 604 instead of an accompanying touch sensors (e.g., 608B). Thus, the value of the electric field 610C may locally vary from the uniform value, causing a change in the capacitance between one or more touch sensors (e.g., 608B) near the object 604 and a reference touch layer.

In some embodiments, the display pixel layer 624 of the electronic display 12A may include the display pixels 620. As mentioned above, the display pixels 620 may each have an image content storage component 626 (e.g., storage capacitor, pixel electrode) that stores electrical energy corresponding to the image data. Depending on the display technology (e.g., liquid crystal displays (LCDs), organic light-emitting diodes (OLEDs)), the electrical energy may cause a luminance corresponding to the image data for each display pixel 618 to display on the electronic display 12. It should be understood that any number of touch sensors 608A-608D, display pixels 620, and display layers may be used during implementation of the electronic display 12A, greater or less than the number shown in FIG. 7. Additionally, while discussion of the display 12A refers to capacitive touch sensors 608A-608D, it should be appreciated that any type of touch sensors may be implemented in by the electronic device 10.

The demand for compact devices 10 and displays 12 with high resolution (e.g., high refresh rates) and/or high touch response, however, may make it difficult to preserve the accuracy and precision of detected touch indications. For example, compact device designs may remove the shielding layer (e.g., air gap and/or dielectric material) typically placed between the touch sense layer 606 and the display pixel layer 624 to block unwanted coupling between the layers. Because the design may place the touch sense layer 606 and the display pixel layer 624 is closer proximity, parasitic capacitance coupling 628 may occur between the touch sensors 608A-608D and the display pixel layer 624, resulting in greater display-to-touch noise that affects the accuracy and precision of detected touch indications. For example, false touch, jittery touch, and/or mis-touch may be perceivable to the user.

The display-to-touch noise may be greater during the active periods since the display pixels 620 may store electrical energy and generate an electric field during that time. The electric field generated by the display pixels 620 may interact with the electric field 610 of the touch sense layer 606, causing unexpected variations in the electric field 610 and thus, false and/or inaccurate detections of touch. Since the display-to-touch noise may be somewhat dependent on the image data and may be greater during the active period, in some embodiments, it may advantageous to avoid the active period. That is, the processor core complex 18 may avoid overlapping the touch scanning period with the active period. However, high refresh rates, high touch scanning frequencies, and longer touch scanning duration times may be used to satisfy demands for high display resolution and/or faster touch response time, which, at least in some instances, make it difficult is not impossible to time multiplex the touch sense operations and the display active operations.

Figure 8A:
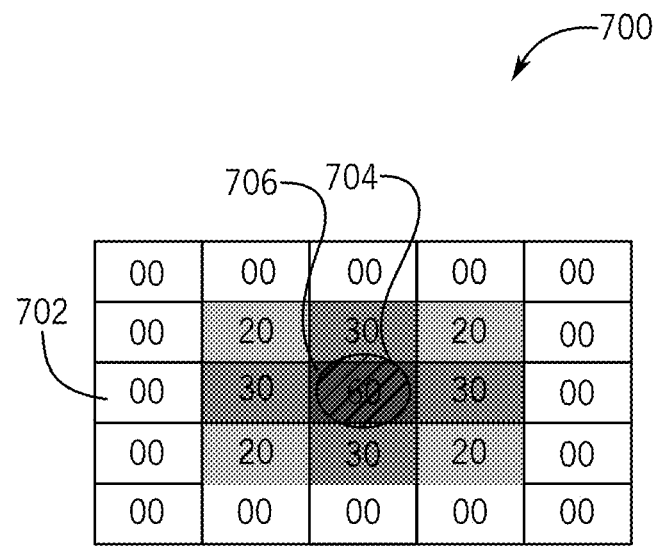
FIG. 8A is a diagrammatic representation of a touch image generated by the touch sense layer of FIG. 7 when display-to-touch noise is less than a noise threshold, in accordance with an embodiment of the present disclosure.
Figure 8B:
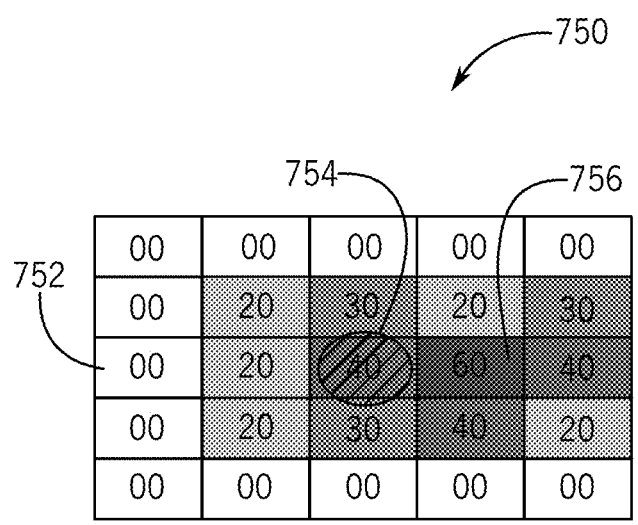
FIG. 8B is a diagrammatic representation of a touch image generated by the touch sense layer of FIG. 7 when the display-to-touch noise is greater than the noise threshold, in accordance with an embodiment of the present disclosure.

FIG. 8A and FIG. 8B demonstrate the effect that display-to-touch noise may have on the precision and/or accuracy of touch indications sensed by a touch sense layer 606. Each touch sensors 608A-608D may sense a variation in the electric field 610 that is reported as variations in the sensed capacitance 612 between the touch sensors 608A-608D and the touch drive electrodes 614. FIG. 8A illustrates an example touch image 700 of the touch indication values 706 sensed by multiple touch sensors 608A-608D of the touch sense layer 606 when the display-to-touch noise is below a noise threshold. Each sector 702 represents area of the display 12 sensed by a touch sensor (e.g., 608A) and the value of each sector 702 represents the touch indication value 706 detected by the touch sensors (e.g., 608A) in that area.

The object 604 may approach or touch the display 12 at a specific location 704. Because the object 604 may divert a portion of the electric field 610 local to the location 704 from the touch sensors (e.g., 608A), the capacitance value (e.g., touch indication value 706) at the location 704 may have a greater change and the touch sense layer 606 may determine that the touch indication occurred at the location 704. That is, the shown gradient represents where the touch sensors 608A-608H detected that a touch indication occurred on the display 12, the darker sector 702 showing the exact location 704 that the touch was determined to occur, the lighter sectors 702 indicating that the touch occurred nearby, and the non-colored sectors 702 indicating that the touch did not occur near those areas of the display 12.

FIG. 8B illustrates an example touch image 750 of the touch indication values sensed by multiple touch sensors 608A-608D of the touch sense layer 606 when the display-to-touch noise is above a noise threshold. As in FIG. 8A, the object 604 may approach or touch the display 12 at a specific location 754. The object 604 may divert a portion of the electric field 610 local to the location 754 from the touch sensors (e.g., 608A).

However, the display-to-touch noise (e.g., display electric field interacting with touch electric field 610 via parasitic capacitance coupling) may generate additional variations in the electric field 610, causing the touch indication value 756 of a touch sensor (e.g., 608D) in an area of the display 12 different from the location 754 of the touch to have the highest touch indication value 756. The touch sense layer 606 may determine that the touch indication occurred at the touch sensors (e.g., 608D) that sensed the highest touch indication value 756 instead of the actual location 754 of touch by the object 604. That is, the shown gradient, representing where the touch sensors 608A-608D detected that a touch indication occurred (e.g., darker sector) on the electronic display 12, does not align with the actual location 754 of the touch indication due to the interference of display-to-touch noise.

In some embodiments, the electronic device 10 may determine that a touch indication has occurred by periodically measuring the variations of the target electrical parameters (e.g., capacitance) during a touch scanning period. For example, the touch scan operations may be time multiplexed with the display operations, such that the touch scanning period does not overlap with the active period. However, as discussed above, design demands of the electronic device 10 and the electronic display 12 make time multiplexing the display operations and touch sense operations difficult.

Figure 9:
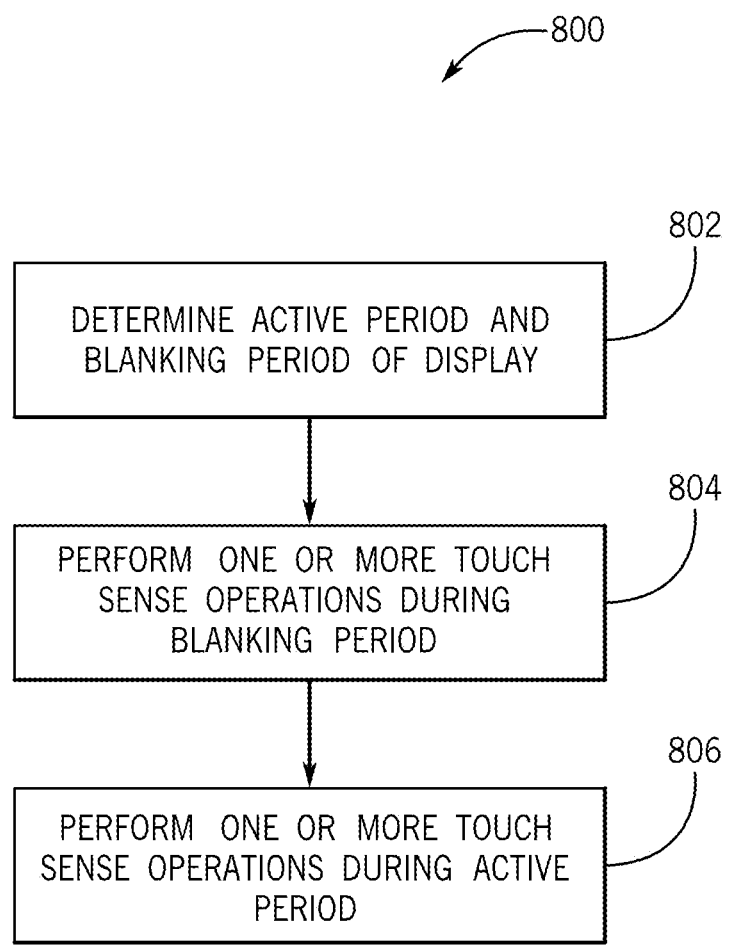
FIG. 9 is a flow diagram of a process for controlling operation of the touch sense layer of FIG. 7, in accordance with an embodiment of the present disclosure.

An example of a process 800 for controlling operation of an electronic display 12 is described in FIG. 9. Generally, the process 800 includes determining an active period and a blanking period of an electronic display (process block 802), performing one or more touch sense operations during the blanking period (process block 804), and performing one or more touch sense operations during the active period (process block 806).

While process 800 is described using steps in a specific sequence, it should be understood that the present disclosure contemplates that the described steps may be performed in different sequences than the sequence illustrated, and certain described steps may be skipped or not performed altogether. In some embodiments, the process 800 may be implemented at least in part executing instructions stored in a tangible, non-transitory, computer-readable medium, such as the memory 20, using processing circuitry, such as the processor core complex 18 or a separate controller. Additionally or alternatively, the process 800 may be implemented at least in part by circuit connections and/or control logic implemented in an electronic device 10.

Thus, in some embodiments, a controller (e.g., a timing controller (TCON)) separate from or included in the processor core complex 18 may determine the active period and the blanking period of the electronic display 12. For example, the electronic display 12 may generate a tearing effect (TE) signal that indicates (e.g., signals) when the electronic display 12 is entering the active period. The processor core complex 18 may use the tearing effect signal to coordinate the timing of the touch scanning period with the display 12. Based on the tearing effect signal, the target refresh rate, and the minimum duration and/or frequency of the touch scanning period, the processor core complex 18 may perform one or more touch sense operations during the display blanking period (process block 804) and during the display active period (process block 806). Examples of touch sense operations include scanning the area of the display 12 by driving the conductive lines of the touch drive electrodes 614 with the touch sensing circuitry and generating the touch image for each touch scanning period representative of the changes in capacitance values 612.

Additionally, in some embodiments, the processor core complex 18 may control the duration and/or frequency of the touch sense operations based on the target refresh rate, target touch response time, and the target touch response period duration. For example, when the target refresh rate is high and, thus the display blanking period duration low, the processor core complex 18 may split the touch scanning period into two such that a first touch scanning period occurs during the active period and a second touch scanning period occurs during the blanking period for each frame period. In some embodiments, the split touch scanning periods may each have a shorter duration than the original touch scanning period; however the total duration of the split scanning periods may be equivalent to the original touch scanning period, for example, to meet that the minimum time for performing touch sense operations per image frame. Further, the touch response time and touch detection accuracy may be preserved since the touch scanning periods and, thus, the touch sensing operations may occur more frequently, for example, compared to if the touch scanning periods were limited only to the blanking period. By placing the touch sense operations partially in the active period and partially in the blanking period, the display-to-touch noise may be significantly reduced (e.g., by 30%) as compared to if the touch sense operation were to occur entirely during the active period.

In some embodiments, the target refresh rate may vary based upon the operation mode of the electronic display 12. For example, the target refresh rate may decrease from 120 Hz to 1 Hz in power saving mode and/or when the image content to be displayed is a still image. In such cases, the controller (e.g., processor core complex 18) may place the touch scanning operation for each frame period entirely within the blanking period, for example, without compromising on the touch response time, touch detection precision, and the display-to-touch noise interference. For example, when the target refresh rate is 1 Hz, the blanking period may include most of the frame period and the controller may place the touch scanning period in the blanking period. The touch scanning period may be kept intact or the processor core complex 18 may split the touch scanning period such that touch sense operations occur more frequently per frame period.

Figure 10:
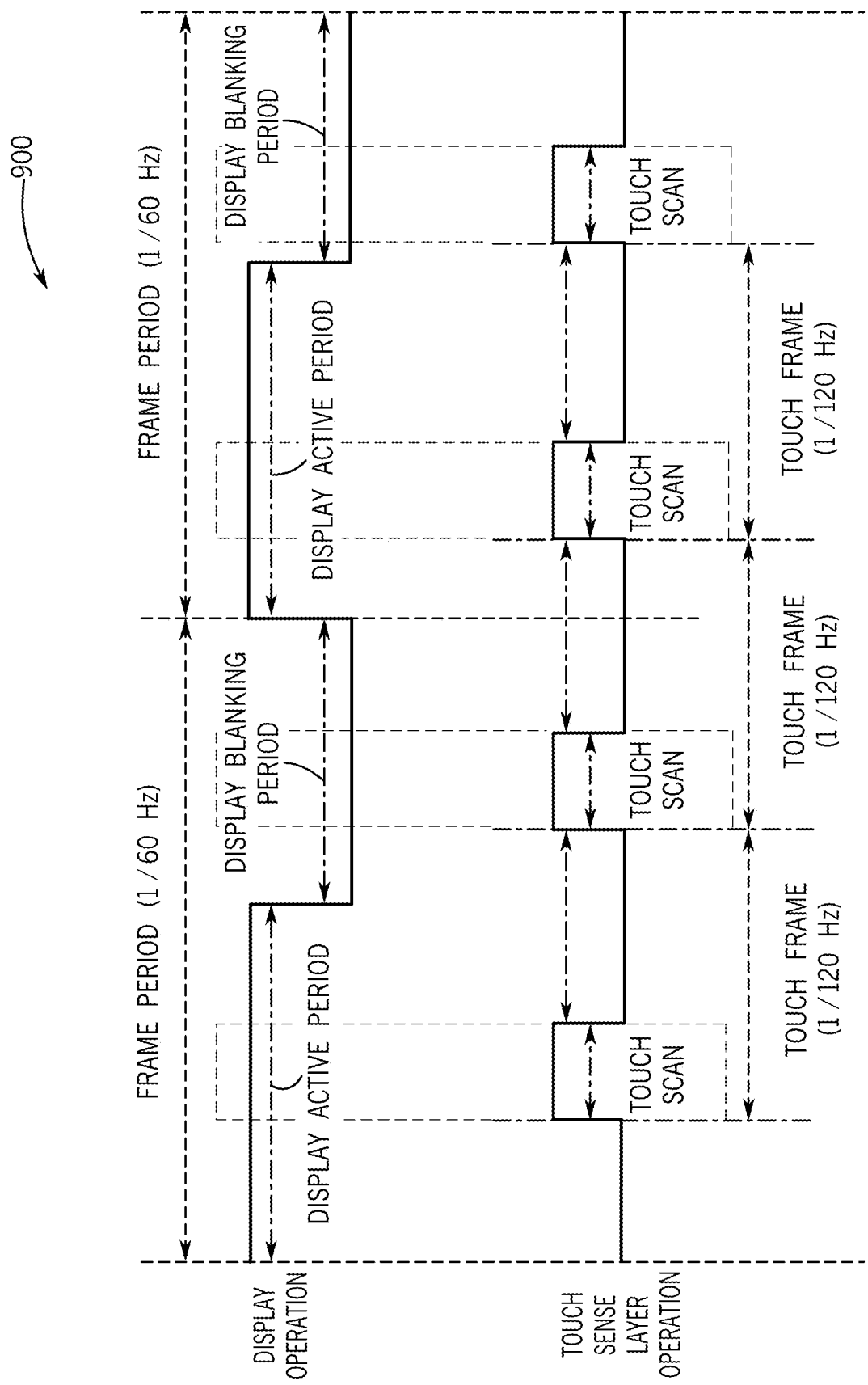
FIG. 10 is a timing diagram that describes operation of the touch sense layer and the display pixel layer of FIG. 7, in accordance with an embodiment of the present disclosure.

FIG. 10 is a timing diagram 900 illustrating an example timing of touch sense operations and the display operations when an electronic display 12 implements split touch sensing periods. As described above, in some embodiments, the controller (e.g., processor core complex 18) may split the touch scanning period such that it is partially located in the active period and partially in the blanking period. For example, when the frame period is 16.67 ms (e.g., 1/60 Hz), the touch scanning period may also have a duration of 16.67 ms, thereby making it impossible to time multiplex the touch sense operations and the active period. The touch scanning period may be split such that the duration of each touch scanning period is 8.33 ms (e.g., 1/120 Hz) and the scanning frequency is 120 Hz. By timing the touch sense operations and the display operations, the display-to-touch noise may be significantly reduced (e.g., by 30%) assuming that the display-to-touch noise follows a Gaussian distribution and the touch response time as compared to when the touch scanning period is entirely or only in one of the blanking period and the active period.

Figure 11:
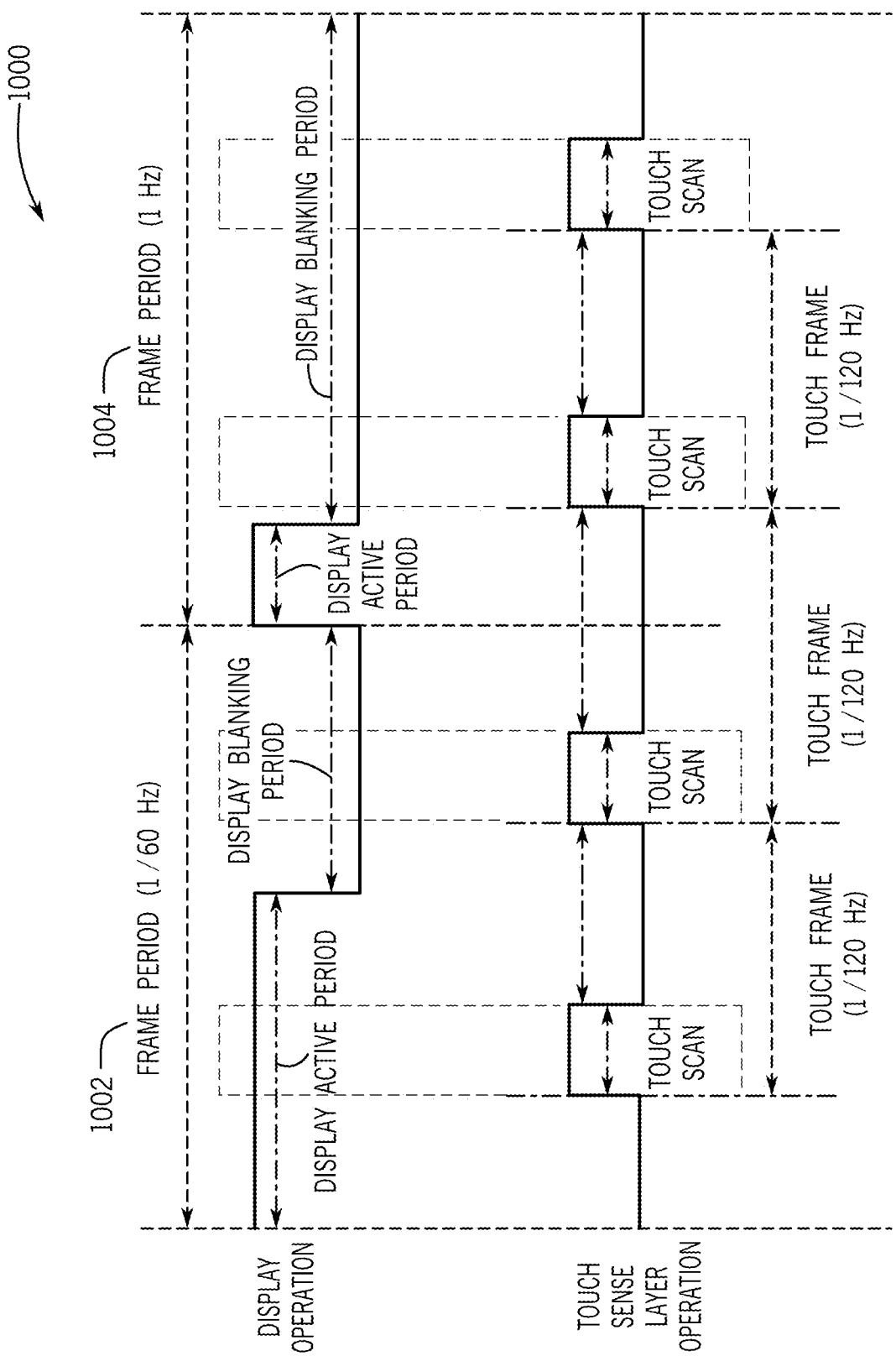
FIG. 11 is another timing diagram that describes operation of the touch sense layer and the display pixel layer of FIG. 7, in accordance with an embodiment of the present disclosure.

FIG. 11 is a timing diagram 1000 illustrating another example timing of touch sense operations and display operations when an electronic display 12 implemented to utilize a variable display refresh rate. As discussed above, in some embodiments, the controller (e.g., processor core complex 18) may use the tearing effect signal to coordinate the active periods and the blanking periods with the touch scanning period. For example, when the refresh rate decreases from 60 Hz to 1 Hz (e.g., frame period 1002 to frame period 1004), the display blanking period may have a longer duration. Thus, the controller may change the timing and/or duration of the touch scanning period such that it occurs during the blanking period when the duration of the blanking period is greater than that of the touch scanning period. Additionally, the controller may split the touch scanning period such that the duration of each split touch scanning period is shorter than the original period and the frequency of the touch scanning period is greater than that of the original, thereby reducing the display-to-touch noise and improving the touch response time.

Figure 12:
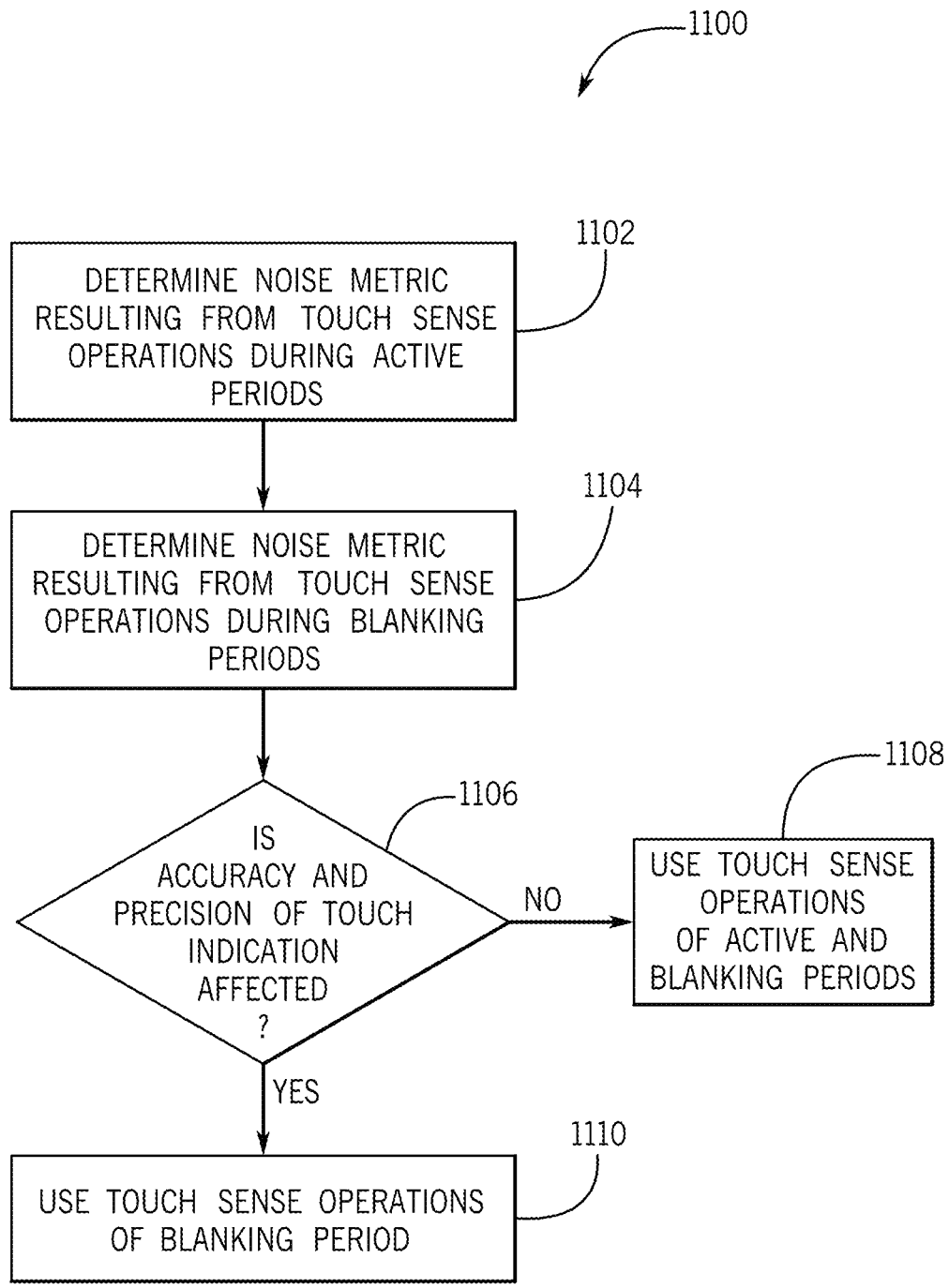
FIG. 12 is a flow diagram of a process for determining timing of the touch sense operations when the display-to-touch noise is above the noise threshold, in accordance with an embodiment of the present disclosure.

In some embodiments, the display-to-touch noise may be too high, such that the accuracy and precision of the detected touch indications is affected despite timing the touch sense operations and the display operations using process 800. FIG. 12 illustrates a process 1100 for determining the timing of touch sense operations when the display-to-touch noise is above a specified noise threshold. Generally, process 1100 includes determining noise metrics resulting from touch sense operations during the active period (process block 1102), determining noise metrics resulting from touch sense operations during the blanking periods (process block 1104), determining whether the accuracy and precision of the touch indication is affected (decision block 1106), using touch sense operations occurring during the active and blanking periods when the accuracy and precision of the touch indication is not affected (process block 1108), and using the touch sense operations occurring only during the blanking periods when the accuracy and precision of the touch indication is affected (process block 1110).

While process 1100 is described using steps in a specific sequence, it should be understood that the present disclosure contemplates that the described steps may be performed in different sequences than the sequence illustrated, and certain described steps may be skipped or not performed altogether. In some embodiments, the process 1100 may be implemented at least in part by executing instructions stored in a tangible, non-transitory, computer-readable medium, such as the memory 20, using processing circuitry, such as the processor core complex 18 or a separate controller. Additionally or alternatively, the process 1100 may be implemented at least in part by circuit connections and/or control logic implemented in an electronic device 10.

Thus, in some embodiments, a controller (e.g., processor core complex 18) may determine a noise metric resulting from touch sense operations that occurred during active periods (process block 1102). For example, the controller may calculate the display-to-touch noise for each touch pixel (e.g., each touch sensors) to determine the overall display-to-touch noise present in each touch image obtained during the touch scanning periods, which occur during the active periods. Further, the controller may determine a standard deviation of multiple (e.g., 30) touch images that were obtained during the active period, for example, to normalize the touch images. In some embodiments, the controller may determine the standard deviation of touch images obtained during the active period on a rolling basis.

Further, in some embodiments, the controller may determine the noise metric from touch sense operations that occurred during the blanking periods (process block 1104). For example, the processor core complex 18 may calculate the display-to-touch noise for each touch image obtained via the touch scanning periods, which occur during the blanking periods. Furthermore, the processor core complex 18 may determine the standard deviation of multiple (e.g., 30) touch images that were obtained during the blanking period, for example, to normalize the touch images. Because the display pixels 620 are idle during the blanking period, the touch images obtained during the display blanking period may be clean or nearly clean of the display-to-touch noise. In some embodiments, the controller may determine the standard deviation of touch images obtained during the blanking period on a rolling basis.

Additionally, in some embodiments, the controller may determine whether the accuracy and precision of the touch indication is affected by the display-to-touch noise (decision block 1106). For example, the controller, on a rolling basis, may determine whether the noise metrics of the active period touch images and of the blanking period touch images are below a specified noise threshold. In some embodiments, the controller may subtract the noise metric associated with the blanking period touch images from the noise metric associated with the active period touch images to remove the image data signal from the display-to-touch noise since the blanking period touch images may include only the image data signal while the active period touch images may include the image data signal and the display-to-touch noise.

When the result is below the noise threshold, the display-to-touch noise may be within an acceptable range such that the accuracy and precision of the touch indication is not affected. As such, the controller may use the touch images from the touch sense operations occurring during the active periods and the blanking periods (process block 1108). That is, the controller may instruct the touch sense layer 606 to keep the touch scanning period frequency as high as possible (e.g., 120 Hz), as shown in timing diagram 900, to maintain accuracy and touch response time.

When the result obtained from comparing (e.g., subtracting) the noise metrics associated with the blanking period touch images and with the active period touch images is above the noise threshold and the noise metric associated with the active period touch images is above a touch scan noise threshold while the noise metric associated with the blanking period touch images is below a touch scan noise threshold, the display-to-touch noise may affect the accuracy and precision of the touch indication. Thus, the controller may instruct the touch sense layer 606 to reduce the touch scanning period frequency (e.g., from 120 Hz to 60 Hz) automatically in noisy environments, essentially removing the touch scanning periods occurring during the active period from consideration. That is, the touch scanning periods that occur during the display active period may be dropped such that only touch images obtained by touch operations occurring during the blanking period are used in determining the presence of the touch indication (process block 1100). In such cases, the touch response time may be affected to facilitate improving accuracy of touch indication detection.

Figure 13:
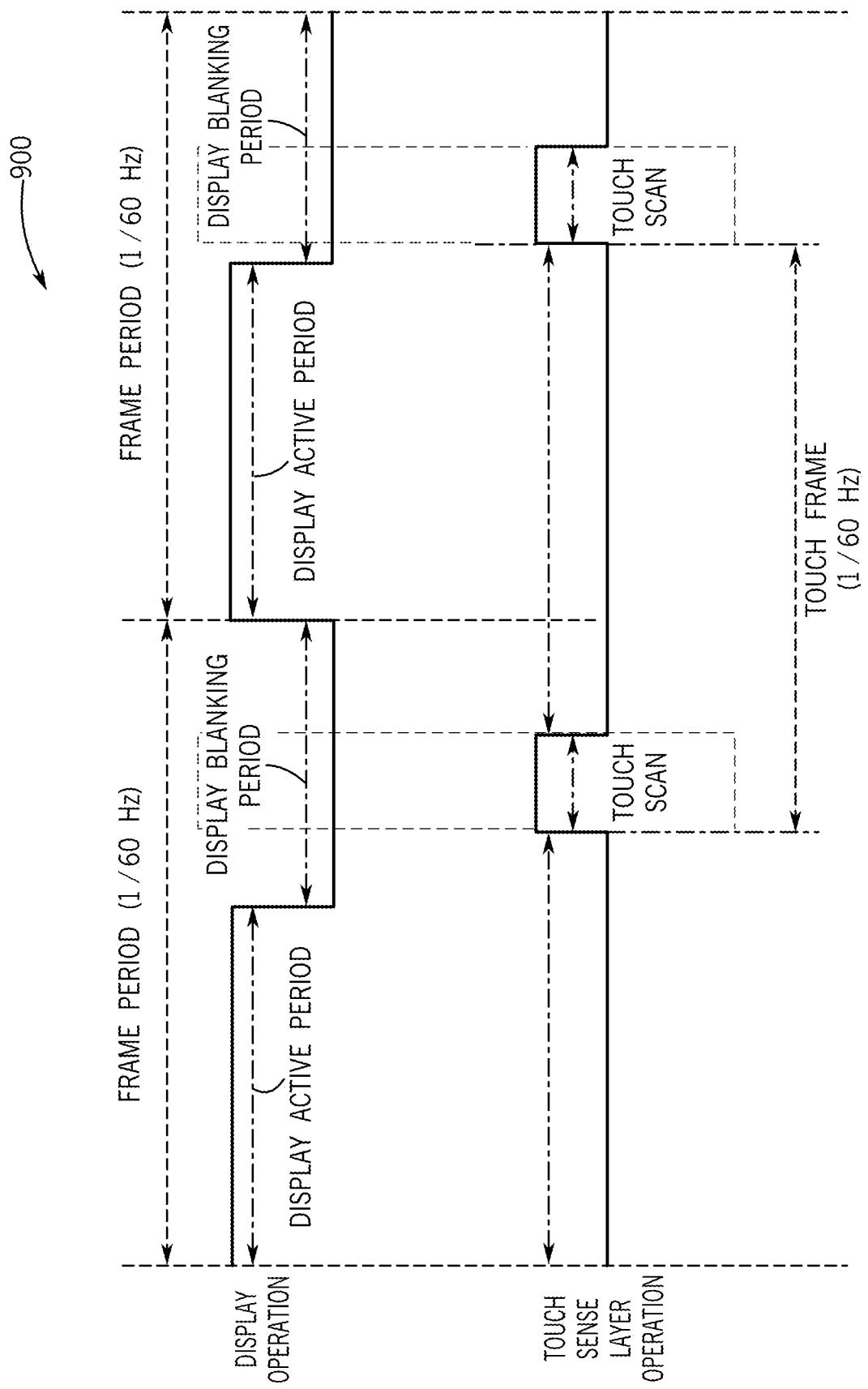
FIG. 13 is another timing diagram that describes operation of the touch sense layer and the display pixel layer of FIG. 7, in accordance with an embodiment of the present disclosure.

FIG. 13 is a timing diagram 1200 illustrating an example timing of touch sense operations and display operations of an electronic display 12 when a display-to-touch noise is greater than a noise threshold. As described above, in some embodiments, the controller may instruct the touch sense layer 606 to drop the touch scanning periods that occur during the active period by reducing the touch scanning period frequency. For example, the touch scanning period frequency may drop 120 Hz to 60 Hz such that the touch scanning period occurs during the blanking periods. As shown in timing diagram 1200, the controller may maintain a touch scanning period duration similar to that when the touch scanning period is split, as shown in timing diagram 900. This may ensure that the touch scanning period remains within the blanking period so that the display-to-touch noise may not affect the accuracy and precision of the touch indication detection.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:
1. An electronic device comprising:
a display pixel layer comprising a plurality of display pixels, wherein the display pixel layer is configured to:
write a first display image during a first active period by controlling electrical energy stored in each of the plurality of display pixels based at least in part on first display image data corresponding with the first display image; and
continue presenting the first display image during a first blanking period directly after the first active period;
a touch sense layer comprising a plurality of touch sense pixels, wherein the touch sense layer is configured to:
generate a first touch image based at least in part on electromagnetic interaction with the plurality of touch sense pixels during a first touch scan period that overlaps with the first active period; and generate a second touch image based at least in part on electromagnetic interaction with the plurality of touch sense pixels during a second touch scan period that overlaps with the first blanking period; and a controller communicatively coupled to the display pixel layer and the touch sense layer, wherein the controller is programmed to:

determine a first noise metric indicative of display-to-touch noise resulting during active periods of the display pixel layer based at least in part on the first touch image determined during the first active period;

determine a second noise metric indicative of display-to-touch noise resulting during blanking periods of the display pixel layer based at least in part on the second touch image determined during the first blanking period; and instruct the touch sense layer to not generate a third touch image during a second active period used to write a second display image after the first display image in response to the first noise metric being greater than a noise threshold and the second noise metric not being greater than the noise threshold.

2. The electronic device of claim 1, wherein the controller is programmed to instruct the touch sense layer to generate the third touch image during the second active period based at least in part on electromagnetic interaction with the plurality of touch sense pixels during a third touch scan period that overlaps with the second active period only in response to the first noise metric being greater than the noise threshold and the second noise metric not being greater than the noise threshold.

3. The electronic device of claim 1, wherein:
the display pixel layer is configured to:
write the second display image during the second active period by controlling electrical energy stored in each of the plurality of display pixels based at least in part on second display image data corresponding with the second display image; and
continue presenting the second display image during a second blanking period directly after the second active period; and the touch sense layer is configured to:
generate the third touch image based at least in part on electromagnetic interaction with the plurality of touch sense pixels during a third touch scan period that overlaps with the second active period; and
generate a fourth touch image based at least in part on electromagnetic interaction with the plurality of touch sense pixels during a fourth touch scan period that overlaps with the second blanking period.

4. The electronic device of claim 3, wherein the controller is programmed to:
update the first noise metric indicative of display-to-touch noise resulting during active periods of the display pixel layer based at least in part on the third touch image in response to the third touch image being determined during the second active period;
update the second noise metric indicative of display-to-touch noise resulting during blanking periods of the display pixel layer based at least in part on the fourth touch image determined during the second blanking period; and
instruct the touch sense layer to not generate a fifth touch image during a third active period used to write a third display image after the second display image in response to the first noise metric being greater than the noise threshold and the second noise metric not being greater than the noise threshold.

5. The electronic device of claim 1, wherein the controller is programmed to instruct the touch sense layer to generate the third touch image during the second active period used to write the second display image in response to the first noise metric being greater than the noise threshold.

6. The electronic device of claim 1, wherein the display pixel layer is configured to produce parasitic capacitance that affects accuracy, precision, or both of touch sensing provided by the touch sense layer.

7. The electronic device of claim 1, wherein:
to determine the first noise metric, the controller is programmed to determine a standard deviation of a first plurality of touch images each determined during an active period of the display pixel layer; and
to determine the second noise metric, the controller is programmed to determine a standard deviation of a second plurality of touch images each determined during a blanking period of the display pixel layer.

8. The electronic device of claim 7, wherein:
the first plurality of touch images comprises touch images determined during active periods of a plurality of display images; and
the second plurality of touch images comprises touch images determined during blanking periods of the plurality of display images.

9. The electronic device of claim 1, comprising an electronic display, wherein the electronic display comprises the display pixel layer and the touch sense layer disposed over the display pixel layer.

10. The electronic device of claim 1, wherein the controller comprises a timing controller implemented in an electronic display.

11. The electronic device of claim 1, wherein the electronic device comprises a portable phone, a media player, a personal data organizer, a handheld game platform, a tablet device, a computer, or any combination thereof.

12. A method for controlling operation of an electronic device implemented with a display pixel layer and a touch sense layer, comprising:
determining, using a controller, a first noise metric indicative of display-to-touch noise resulting during active periods of the display pixel layer based at least in part on a first touch image determined during a first active period by the touch sense layer;
determining, using the controller, a second noise metric indicative of display-to-touch noise resulting during blanking periods of the display pixel layer based at least in part on a second touch image determined during a first blanking period by the touch sense layer; and
instructing, using the controller, the touch sense layer to not generate a third touch image during a second active period used to write a display image in response to the first noise metric being greater than a noise threshold and the second noise metric not being greater than the noise threshold.

13. The method of claim 12, comprising:
updating, using the controller, the first noise metric based at least in part on the third touch image in response to the third touch image being determined during the second active period;
updating, using the controller, the second noise metric based at least in part on a fourth touch image determined during a second blanking period; and
instructing, using the controller, the touch sense layer to generate a fifth touch image during a third active period used to write a second display image after the display image in response to the first noise metric being greater than the noise threshold and the second noise metric not being greater than the noise threshold.

14. The method of claim 12, wherein:
determining the first noise metric comprises determining, via the controller, a standard deviation of a first plurality of touch images determined by the touch sense layer during the active periods of the display pixel layer; and
determining the second noise metric comprises determining, via the controller, a standard deviation of a second plurality of touch images determined by the touch sense layer during the blanking periods of the display pixel layer.

15. The method of claim 14, wherein:
the first plurality of touch images comprises touch images determined during active periods of a plurality of display images; and
the second plurality of touch images comprises touch images determined during blanking periods of the plurality of display images.

16. The method of claim 12, wherein a frequency of the display pixel layer is the same as a frequency of the touch sense layer.

17. A tangible, non-transitory, computer-readable medium that stores instructions executable by one or more processors of an electronic device, wherein the instructions comprise instructions to:
instruct, using the one or more processors, the electronic device to determine a first noise metric indicative of display-to-touch noise resulting during active periods of a display pixel layer based at least in part on a first touch image determined during a first active period by a touch sense layer;
instruct, using the one or more processors, the electronic device to determine a second noise metric indicative of display-to-touch noise resulting during blanking periods of the display pixel layer based at least in part on a second touch image determined during a first blanking period by the touch sense layer; and
instruct, using the one or more processors, the touch sense layer to not generate a third touch image during a second active period used to write a display image in response to the first noise metric being greater than a noise threshold and the second noise metric not being greater than the noise threshold.

18. The tangible, non-transitory, computer-readable medium of claim 17, wherein:
the first touch image is determined based at least in part on electromagnetic interaction with a plurality of touch sense pixels of the touch sense layer during a first touch scan period that overlaps with the first active period;
the second touch image is determined based at least in part on electromagnetic interaction with the plurality of touch sense pixels of the touch sense layer during a second touch scan period that overlaps with the first blanking period.

19. The tangible, non-transitory, computer-readable medium of claim 17, wherein the instructions executable by the one or more processors of the electronic device comprise instructions to:
instruct, using the one or more processors, the electronic device to update the first noise metric based at least in part on the third touch image in response to the third touch image being determined during the second active period;
instruct, using the one or more processors, the electronic device to update the second noise metric based at least in part on a fourth touch image determined during a second blanking period; and
instruct, using the one or more processors, the electronic device to update the touch sense layer to generate a fifth touch image during a third active period used to write a second display image after the display image in response to the first noise metric being greater than the noise threshold and the second noise metric not being greater than the noise threshold.

20. The tangible, non-transitory, computer-readable medium of claim 17, wherein:
instructions to determine the first noise metric comprise determining, using the one or more processors, a standard deviation of a first plurality of touch images determined by the touch sense layer during the first active period of the display pixel layer; and
instructions to determine the second noise metric comprise determining, using the one or more processors, a standard deviation of a second plurality of touch images determined by the touch sense layer during the first blanking period of the display pixel layer.

* * * * *